United States Patent Office 3,778,281
Patented Dec. 11, 1973

3,778,281
FUSION BONDED VERMICULITE MOLDING MATERIAL
Patrick M. Brown, Baltimore, Md., Heyman C. Duecker, Cambridge, Mass., and Dorothy C. de Vore, Baltimore, Md., assignors to W. R. Grace & Co., New York, N.Y.
Filed Dec. 16, 1971, Ser. No. 208,601
Int. Cl. C04b 33/00
U.S. Cl. 106—67
11 Claims

ABSTRACT OF THE DISCLOSURE

Fusion bonded vermiculite molding material prepared from vermiculite, sodium borate, sodium metaphosphate and clay is used to prepare a variety of materials and structures including, among others, a strong, lightweight decorative fire resistant board, a superior foundry mold and a lightweight synthetic aggregate.

BACKGROUND OF THE INVENTION

Prior art

Figure 1:

The use of siliceous particles in admixture with various compounds to produce wallboard and the like is well known. U.S. Pat. 2,919,202 discloses a refractory insulating brick made of vermiculite and magnesium sulfate. U.S. Pat. 3,353,975 discloses a product comprising perlite and vermiculite, clay beads, glass foam, organo-silanes, and an inorganic binder. U.S. Pat. 3,418,402 discloses a panel comprising perlite and clay. U.S. Pat. 3,256,105 discloses a ceramic molding composition consisting of fused glass, an inorganic binder, and surface active agents. U.S. Pat. 3,010,835 discloses a composition consisting of perlite, kyanite, calcium-aluminate, and calcined alumina. Other commonly used products consist of perlite and asphalt; perlite, sodium silicate and powdered rock salt; perlite and water glass; perlite, kaolin, and bentonite; clay and vermiculite; perlite, cement, asbestos, a silicate, and alumina powder; and perlite, kyanite, calcined flint-fused clay, and calcium aluminates.

U.S. Pat. 3,030,218 discloses a method of preparing a refractory and structural clay product wherein the product also contains vermiculite. It is also disclosed in U.S. 3,030,218 that particularly useful clays are pre-Cambrian shale, alluvial clay, South Carolina kaolin, Tennessee ball clay, and Alabama coal measure clay. The weight percent ratio of vermiculite to clay in said patent used to prepare the product obtained there was 98–60:2–40. The process disclosed requires intimate admixing of the components by mulling or extensive mixing which results in relatively dense bodies.

However, these products do not exhibit all the characteristics of good strength, heat resistance, fire resistance, lightness in weight, and the utilization of inexpensive raw materials.

Vermiculite molding powders have been prepared that can be pressed into various shapes and forms. Vermiculite is a lamellar-type material which when heated rapidly expands to a lightweight interconnected plate-like material. However, attempts to produce high strength, lightweight, vermiculite products have generally been unsuccessful. In order to develop a material of high strength and low density, the proper coating, mixing, pressing and firing for the proper period of time at temperature is essential.

OBJECTS OF THE INVENTION

It is accordingly an object of the invention to prepare a molding material which comprises vermiculite, clay as a binder, and a flux. This molding material is a free-flowing readily moldable powder, which can be used to form a multitude of products.

It is a further object of this invention to describe a process for preparing this readily moldable free-flowing powder.

It is still further an object of this invention to describe a process for preparing a fused vermiculite product which is strong and lightweight in a minimum amount of time and at relatively low temperatures.

It is a further object of this invention to use this molding material to produce products comprising vermiculite, clay, sodium metaphosphate, and borax which, when properly formed and fired, can be used to prepare a lightweight aggregate, a superior foundry mold, an insulating board, fire door core, elevator door core, elevator shaft lining, acoustical tile, lightweight foams, gas filters, disposable dishes, flue liners, sandwich panel, glazed tile, exterior and interior veneers, catalyst support, cigarette filters, imitation brick, fire shield, steel column fire protection, and which is lightweight and completely inorganic in nature.

It is a further object of this invention to describe a process for preparing a fused vermiculite product from which a board can be prepared without the need for an additional glazing step.

BRIEF DESCRIPTION OF THE INVENTION

We have found that a free-flowing lightweight vermiculite molding material can be prepared by proper coating and gentle blending of the vermiculite, clay and borate-phosphate flux. This is accomplished by either of two methods. In the first method, the vermiculite and clay are gently blended, a flux solution is prepared and this solution is gently blended into the dry components.

In the second method, the flux solution is prepared and the clay is thoroughly dispersed in this solution. The resultant slurry is then gently blended with the vermiculite. The method of blending the components is critically important. It is essential that each vermiculite particle be homogeneously coated with the other components. Furthermore, it is essential that in the blending the lightweight friable vermiculite particles are not compacted. These blending and coating conditions are essential to prepare a molding powder, which when formed, produces a strong lightweight body. It is necessary to adhere to these conditions of gentle homogeneous blending of these materials to obtain the fine microstructure created upon firing. This fine microstructure leads to a continuous matrix and products of exceptional strength. By selectively choosing the particlar type of vermiculite to be used (coarse or fine) the density of the finally obtained product and the strength of the end product can be varied. These characteristics can also be affected by the relative percentages of each of the ingredients described above. For example, by selectively using the above-described ingredients, a fused vermiculite board can be prepared at temperatures as low as 1300° F. and the resulting product has a vermiculite matrix bonded together by a continuous second phase. The actual obtained products range in characteristics having a strength of from 30 p.s.i. to 2,000 p.s.i. and densities of 12/lbs./ft.$^3$ to 80 lbs./ft.$^3$.

The use of the flux, i.e., borax and sodium metaphosphate, allows fusions at less than 1300° F. Other low-melting phosphates can also be used. An example is sodium pyrophosphate. Hence, for purposes of the specification and claims, sodium metaphosphate also include sodium pyrophosphate. A fused lightweight, strong vermiculite board having varying densities and varying strength dependent upon the composition of the product and the firing times can be prepared from these molding materials.

Molding materials disclosed herein are extremely lightweight due to the trapped air within the product. Reference to the figures shows that the unique fusion which takes place occurs only at the end of the particles of vermiculite thereby producing an "accordian-type" effect wherein air is trapped within the fused points. The air pockets will, of course, greatly assist in enhancing the insulation qualities of the product.

For purposes of the specification and claims, reference to percent is to be understood to mean percent by weight.

DETAILED DESCRIPTION OF THE INVENTION

The first step of our process is selection of the ingredients. The clay which is used is generally preferred to be bentonite clay. However, other plate-like clays can be substituted for the bentonite clay. The reason for the preference of plate-like clays is that the product produced from the molding powder has good green strength. Thus, it can be said that preferably a plate-like clay should be used. However, typically useful clays include pre-Cambrian shale, alluvial clay, South Carolina kaolin, Tennessee ball clay, Alabama coal measure clay, and the like.

Any of the commercially available vermiculite materials may be employed in the practice of this invention. Vermiculities include the "No. 2" and "No. 5" variety which are characterized by a density of 4–8 and 8–11 pounds per cubic foot respectively, and a screen analyses (by weight) are shown in the accompanying table. Numbers 1, 3 and 4 vermiculites have also been used depending on the desired physical properties of the final product.

TABLE I.—VERMICULITE NO. 2

| Sieve size: | Max. | Min. |
|---|---|---|
| 4 | 5 | 0 |
| 8 | 80 | 20 |
| 16 | 99 | 75 |
| 30 | 100 | 90 |

TABLE II.—VERMICULITE NO. 5

| Sieve size: | Max. | Min. |
|---|---|---|
| 16 | 0 | 0 |
| 30 | 10 | 0 |
| 50 | 50 | 10 |
| 100 | 85 | 55 |

These and other vermiculites are generally quite soft and fragile. The vermiculite particle cannot readily withstand processing operations which apply pressure or tend to shear the vermiculite granules. The effectiveness of the lightweight vermiculite is reduced when subjected to pressure or shearing. Occasionally it is desired to use a fibrous material as part of the admixture. This is particularly desired when extra strength is desired and when the cold-pressing is used. The fibers hold the other components together by limiting the amount of decompression which take place and thereby forming a strong green body which is not otherwise obtainable. Typically useful fibrous materials include wollastonite, glass wool, asbestos, and the like. Organic fibers or other fillers may be used in certain cases.

The flux which is used is a combination of borax and sodium metaphosphate. The borax or sodium borate ($Na_2B_4O_7 \cdot 10H_2O$) and the sodium metaphosphate ($NaPO_3)_6$ allow the binding (fusion) of the clay and vermiculite to occur at temperatures as low as 1300° F. and produce a product having a vermiculite matrix bonded together by a continuous phase. It is by the use of this flux, i.e. borax and phosphate, that the strength and lightness in the product can be obtained at the low temperature heretofore not possible. Although we prefer to use the decahydrate form of sodium borate, the anhydrous form is also operable in the flux which is used, e.g., borax and phosphate. (A 2:1 ratio of the borate to phosphate is preferred). The flux is present as about 0.01 to 8 weight percent preferably 0.01 to 4 weight percent.

The amount of water which is used is not essential to the success of the process except that only sufficient water should be used to prepare a workable material, such that when formed, it provides satisfactory green strength. Low water content of the admixture is used to prepare products with quick drying properties. The proper coating and blending of the vermiculite and other components is very important since the expended vermiculite is by nature a relatively soft, easily compacted material. It is quite easy to compact the material prior to forming the desired shape, but this results in a dense and relatively weak material without interlocking platelets. And, as vermiculite is a rather porous material which readily absorbs moisture, it is quite difficult to properly coat vermiculite with a binder at its surface where the majority of bonding occurs. Thus, it is necessary to prevent the binding agent from being absorbed by the vermiculite because if absorption does occur very little binder is left near the surface, the binder's efficiency is quite poor, and a low strength product results.

Proper blending of the components is necessary for preparation of our homogeneous, uncompacted, low bulk density free-flowing molding powder.

By using various amounts of clay, binder, varying particle size of vermiculite, and in some cases fibrous materials such as wollastonite, it is possible to make a range of boards having strength varying from 30 p.s.i. to 2,000 p.s.i. flexural strength, and densities of 12 lbs./ft.$^3$ to 80 lbs./ft.$^3$. Under certain conditions, by slow drying of the product, it is possible to obtain completely glazed materials due to the fact that during the slow drying process the flux solution migrates to the surface and deposits at that point as water evaporates. This area of high flux concentration then readily melts during the firing operation. The product is therefore basically a vermiculite interior with a highly vitreous non-permeable coating.

The board prepared from the molding material of our invention is characterized by:

(a) a density in the range of about 10–80 pounds per cubic foot,
(b) an exceptional green strength, i.e. modulus of rupture of about 5 to 105 pounds per square inch, depending on the water content.
(c) low shrinkage on firing i.e., less than 0.1 to 6% on firing at temperatures of 1500–2200° F.,
(d) a smooth uniform texture with a particularly pleasing surface appearance,
(e) an exceptional strength to density relationship.

After sintering, one of the boards of this invention has the following composition: 88–12% clay (e.g. bentonite), 0.01 to 8, preferably 0.01–4% borax ($Na_2B_4O_7 \cdot 10H_2O$), 0.01–2% phosphates (e.g. $NaPO_3)_6$, 12–88 percent vermiculite, 0–18% fibrous material. The product is prepared by admixing the clay, vermiculite, borax, phosphate, and fibrous material (if desired) in the prescribed order and desired proportions. In preparing a board, this admixture is homogeneously blended hot-pressed at about 400° F. and then fired at 1400° F. for about 20–60 minutes. The product which is produced by this particular embodiment of invention has a density of about 12–26 lbs./ft.$^3$.

In a second variation of this embodiment of the invention, a board having a higher density than that of the first embodiment is obtained by blending in the prescribed order the following: 8 to 12% clay, 2 to 4% borax, 1 to 2% phosphate, 23 to 35% vermiculite (No. 5), and 45 to 65% water. The final product is obtained by homogeneously blending the components, hot-pressing at about 400° F., and firing at about 1400° F. This, of course, drives off most of the water and produces a product having the following composition: 8 to 12% clay, 1 to 2% borax, 1 to 2% phosphate, 23 to 35% vermiculite. The density of such a composition is 24–32 lbs./ft.$^3$. Preferably when forming this type of vermiculite product, the components are admixed in the following relationship: 30% vermiculite, 11.1% clay, 3.2 borax, 1.6% phosphates are dry blended and a solution of 53.8% water is added with gentle blending. This product will exhibit a higher strength than the cold-pressed composition at the same density. This embodiment is particularly useful as a sandwich panel or an insulating board.

In a third variation of this embodiment of the invention, a board having a density of 32–37 lbs./ft.$^3$ is obtained by blending in the prescribed order the following compents: 12 to 13% clay, 3 to 4% borax, 1 to 2% phosphates, 25 to 30% vermiculite (No. 5) 50 to 60% water, and optionally 1.5 to 2.4% fibers, e.g. wollastonite. Such an admixture of components produces a final product containing 24 to 29% clay, 6 to 8% borax, 3 to 4% phosphates, 55 to 60% vermiculite, and 8 to 10% wollastonite. A preferable admixture of this particular type product is as follows: 12.4% clay, 3.2% borax, 1.6% phosphates, 10 to 27% vermiculite, 4.0% wollastonite, and 52% water. This product which is cold-pressed is prepared by admixing the components homogeneously and cold-pressing the product to approximately 25% of its original volume and firing for about 20 minutes at about 750° F. Such a product is especially useful as a sandwich panel or a glazed wallboard.

In a fourth variation of this embodiment of the invention, 11 to 13% bentonite clay, 9 to 11% kaolin clay, 0.6 to 1.2% borax, 0.3 to 0.6% phosphates, 20–25% vermiculite (No. 5), 0–20, 2 to 3% wollastonite (optional), and 45 to 60% water are admixed in the afore described manner. The composition is then cold-pressed to about 25% its original volume, fired for 20 minutes at 800° C. and then at about 900° C. for an additional 5 minutes. This produces a product having a density in the range of 40–45 lbs./ft.$^3$. In a preferable admixture, the following components are admixed: 12.0% bentonite clay, 9.9% kaolin clay, 1.1% borax, 0.45% phosphates, 22.5% No. 5 vermiculite, 50.2% water and optionally to 3.8% wollastonite. This will produce a product having a density of about 42 lbs./ft.$^3$. The product of this embodiment is particularly useful as a building veneer, a sandwich panel, and a firebreak in elevator shafts and stairwells. If the above-described composition is heated to about 1950° F. over a six-hour period, a product of about 60 lbs./ft.$^3$ is obtained.

As stated heretofore, variations of the product disclosed herein are possible and determined by the use desired for the product.

In a fifth variation of this embodiment of the invention, 35–45% bentonite clay, 55–65% vermiculite, and 0.3 to 0.9% borax, 0.01 to 0.6% phosphates dissolved in 12–25% water are simultaneously blended. The composition is then cold-pressed to a fraction of its original volume and fired for a period of 0.25–4 hours at temperatures of 1300°–1950° F. This produces a product having a density in the range of 55–65 lbs./ft. The product can be coated with a green glaze prior to firing to develop a hard impervious finish. This embodiment is particularly useful in an interior or exterior building veneer or a firebreak in elevator shafts and stairwells.

Hot-pressing is accomplished by admixing the components, and pressing with about 5–75 p.s.i. and heating to about 200–400° F. Cold-pressing is accomplished by pressing the molding material at pressures of 20 to 1000 p.s.i. at ambient temperatures. Generally, hot-pressing is desired to prepare the low density products as it gives a stronger board since as much as 40% of the water can be driven off during the pressing of the board (which causes binding and prevents decompression), thus giving a good dried strength. The cold-pressing method is used when a product is desired having a density greater than 20 lbs./ft.$^3$. The cold pressing operation is the preferred method when producing denser bodies since at higher densities the porosity is diminished and it is not then possible to remove the water satisfactory during the hot-pressing cycle and extended time periods are required. However, the addition of extra clay or fibrous materials, e.g., wollastonite, glass wool, certain organic fibers, etc. aids in limiting decompression after the cold-pressing step thereby giving improved strength to the undried and unfired body.

Although most of the prior art processes require firing for long periods of time at relatively high temperatures, our product is recovered after firing for short periods (20 minutes to 3 hours) at temperatures as low as 1300–2200° F.

When an aggregate is being formed, for example, additional steps are required to form the aggregate after the ingredients have been mixed. The molding material is balled by addition of water and dried. The aggregate can then be coated with a glazing component or directly fired.

The properties of the products prepared from our molding material can be varied by varying the composition of the molding material, and the temperatures and pressures used in the pressing step, when formed products are being prepared.

In addition, different process conditions are used to prepare different materials. The mixing and firing conditons used to prepare a lightweight aggregate differ substantially from conditions used when a foundry mold is the end product. In addition, the composition of the molding material, the mixing conditions, forming pressures and firing temperatures are varied, when the end product is a board, to develop the desired density, surface conditions, etc. in the board.

The final step in using the molding material of our invention is a firing step. In a typical firing cycle, the product is heated to a firing of about 1300 to 1950° F., over a period of time necessary to obtain the desired properties. The products are maintained at this temperature for period of 2 minutes to 2 hours.

It is noted that it is essential that the flux-binder system disclosed herein be used in order to effect a binding which gives an "accordion" type vermiculite-clay product wherein air is trapped within the vermiculite particles which are bonded with a second continuous vitreous phase. This feature is shown in the drawings.

The unique properties of our product result at least in part from the method in which the individual particles of the composition are bonded together by the flux. The figures show these characteristics quite well.

Figure 2:
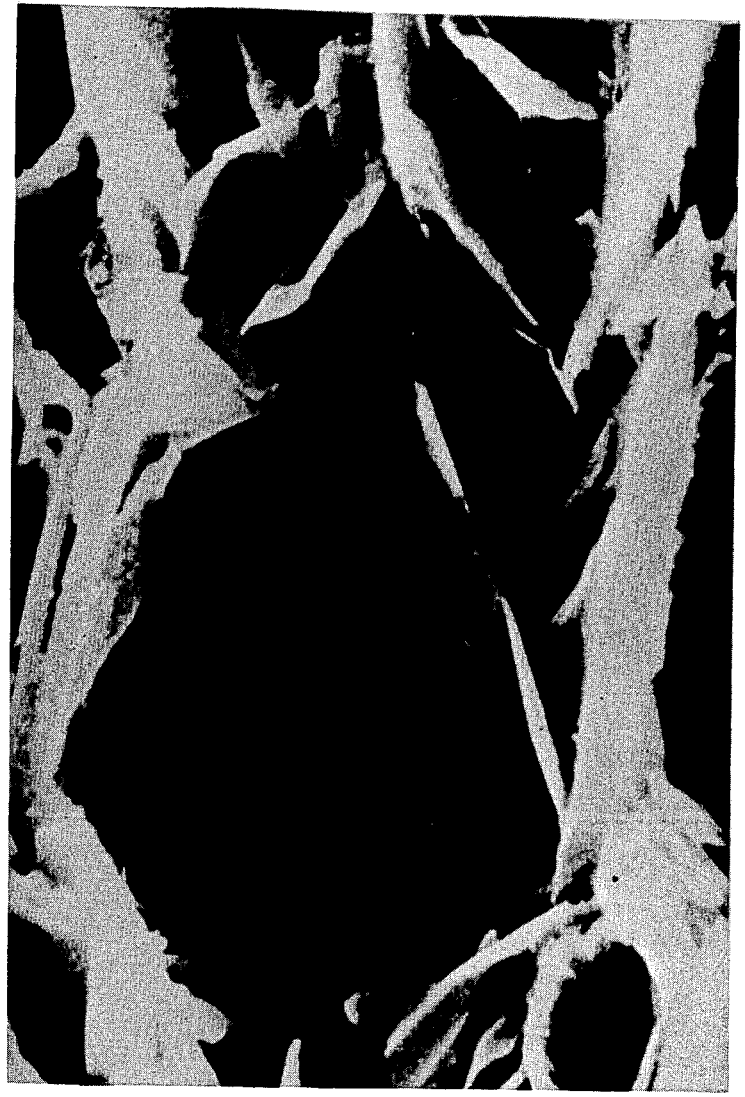

These and other expanded vermiculities are generally quite soft and fragile as a consequence of thermal dehydration. FIG. 1 illustrates an abundance of very fine pores or channels remaining in the thin crystalline lamellae after expansion. FIG. 2 shows the somewhat shrunken, distored and fragmentary character of the lamellae in situ in a typical "grain" of expanded No. 5 vermiculite. Because of this initially very fragile microstructure, the vermiculite "grain" cannot readily withstand processing operations which apply pressure or tend to shear the vermiculite granules. The effectiveness of the lightweight vermiculite is reduced when subjected to pressure or shearing. Furthermore, the openness of the structure between lamellae of the expanded "grain," coupled with the highly absorptive character of the very fine pores within the lamellae resulting from dehydration of the original mineral, can be seen to account for vermiculite's well-known affinity for and retention of very substantial quantities of water. When appropriate binders and fluxes are used in accordance with our invention to bind the vermiculite (together with clays and/or other constituents, if present) there is generally a complete binding of separate "grains" as well as a densifying and strengthening transformation of the individual vermiculite lamellae, thus producing a stable, strong and compact body. These very desirable consequences of proper application of our invention may be readily understood by considering the microstructural evidences discussed below.

Figure 3:
Figure 4:
Figure 5:
Figure 6:
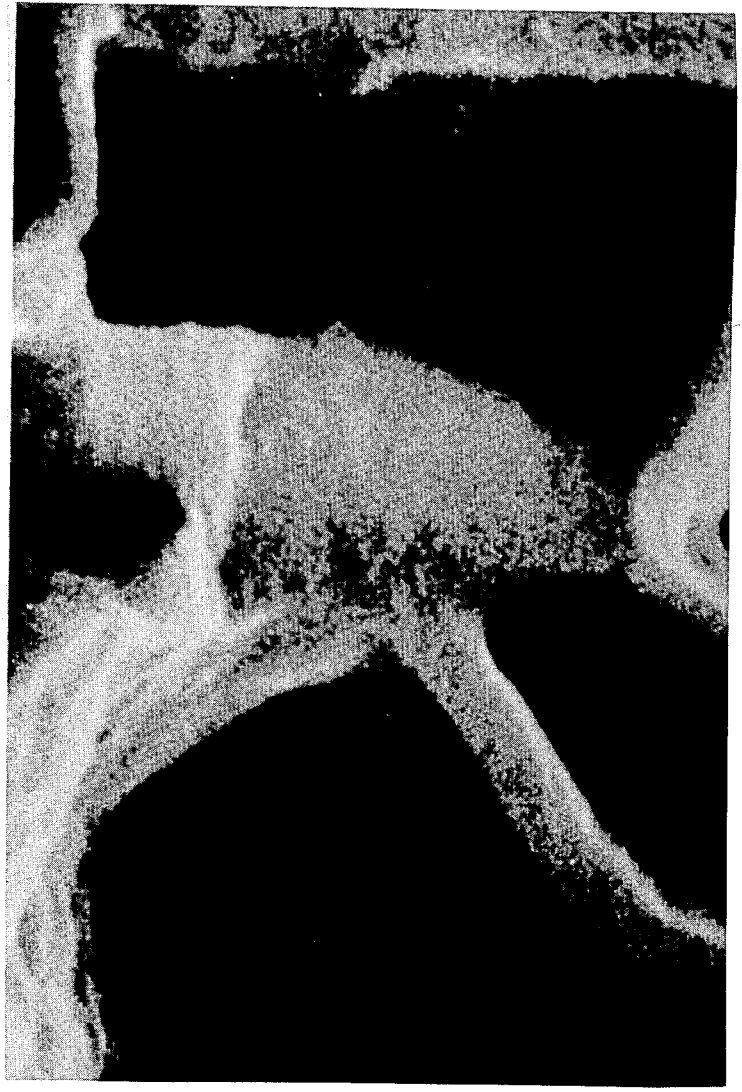

Though both the principal mineral constituents in FIG. 3, namely vermiculite "grains" and acicular wollastonite "fibers," are highly anisotropic, FIG. 4 shows that the processing steps of blending, mixing and pressing tend to produce a substantially randomized distribution of orientations among and between the phases, hence leading to pseudoisotropic microstructures and to essentially isotropic physical properties. The glassy bond phase (resulting from thermally induced melting and/or eutectic interactions of the bentonite and flux constituents) coats and seats the "grains," and "fibers," and partially though not completely fills interstices between them. In this figure, and at higher magnification in FIG. 5, it is apparent that the vermiculite "grains" have been flexed or compressed in a variety of ways during cold or hot pressing, but that in general the individual lamellae have been retained, producing a well-bonded but very low density honeycomb-like structure within each "grain." At still higher magnification, FIGS. 3 and 6 show fracture cross sections through the fired product resulting from two such differently compressed grains; in one, the lamellae were originally pushed almost together, in the other, flexing forces resulted in expansion and buckling. In all possible configurations of the original lamellae, the fired product consistently displays microstructural evidences of strong, generally well-filleted bonding junctions between lamellae, nonplanar shapes, and internal texturing characteristics of a dense, very fine grained polycrystalline material. In each of these respects, lamellae within the fired product differ markedly from those of the original vermiculite (see FIGS. 1 and 2); these marked microstructural differences account for the unique combination of high strength, low density, and insensitivity to water-bearing environments which is obtained with our invention.

Figure 7:
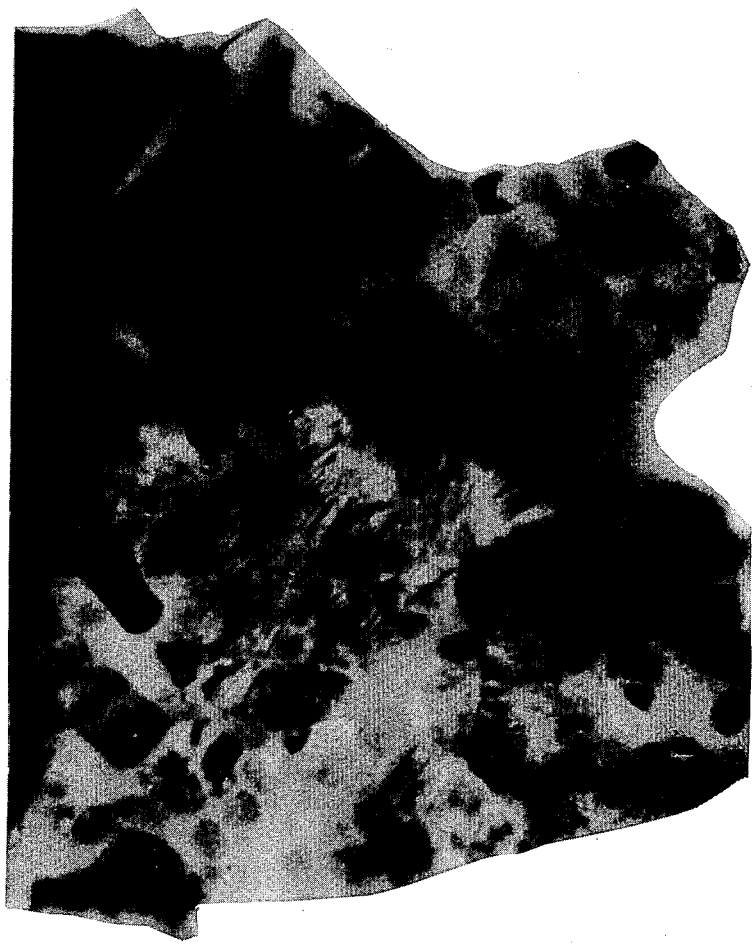

FIG. 7, a transmission electron micrograph of one such lamella retrieved from a fired product produced in accordance with Example 8, clearly shows the development of a dispersed very fine (0.1 dia) crystalline phase (some of them are overlapping, causing more fringe effects) within the lamellae. Note too, that the original very fine porosity (see FIG. 1) of the expanded vermiculite lamellae has been removed. Though the exact crystallographic details of the transformation have not yet been resolved, it is apparent that the lamelae have been joined, densified and strengthened (through development of a very fine polyphase crystalline structure) as a consequence of the combined action of (1) binder-flux additives and (2) subsequent thermal processing which jointly comprise the principal features of our invention. The following examples are not intended to in any way restrict the invention disclosed herein but will assist in its understanding.

EXAMPLE 1

Examples 1 through 5 describe methods of preparing board structures. Twelve grams sodium borate and 6 grams sodium metaphosphate were dissolved in 255 grams of water. The solution was then placed in a Waring Blender and 45 grams bentonite clay (commercially available from Dresser Industries, Houston, Tex.) were slowly added with mixing.

A total of 150 grams No. 2 vermiculite were placed in the bowl of a Hobart mixer (commercially available from Kitchen Aide Products) and gently blended with the clay slurry. When a homogeneous mixture was obtained, the whole mixture was placed into a mold and hot-pressed at 400° F. The firing time was 15 minutes and a product having a density of 12 lbs./ft.$^3$ was obtained.

EXAMPLE 2

Sixteen grams of sodium borate decahydrate and 8 grams sodium metaphosphate were dissolved in 270 grams water. This admixture was then placed in a Waring Blender and 55 grams of bentonite clay were slowly added with mixing. This clay slurry and 150 grams No. 5 vermiculite were then placed in a bowl of a Hobart mixer and gently blended until homogeneity was obtained. The mixture was then hot-pressed in a mold at 400° F. The product obtained had a density of 24.2 lbs./ft.$^3$.

EXAMPLE 3

Sixteen grams sodium borate decahydrate and 8 grams sodium metaphosphate were dissolved in 250 grams of water. The solution was then placed in a beaker and stirred rapidly while adding 60 grams of bentonite and then placed in a Hobart mixer bowl containing 130 grams No. 5 vermiculite and 20 grams wollastonite fiber (commercially available from Interpace, Inc.) and gently blended. This admixture was then cold-pressed until it was about 25% its original volume and fired for 20 minutes at 750° F. The board had a density of 35.4 lbs./ft.$^3$.

EXAMPLE 4

Six grams sodium borate decahydrate and 3 grams sodium metaphosphate were dissolved in 250 grams of water. The solution was placed in a beaker and stirred rapidly while adding 60 grams of bentonite clay. The mixture was then mixed in a Hobart mixer for about 1 minute to obtain homogeneity. To this admixture were added the following: 112 grams No. 5 vermiculite, 50 grams Edgar Ball clay (commercially available from Georgia Kaolin Co.), and 20 grams wollastonite fiber. The mixture was gently blended in the Hobart mixer until a homogeneous slurry was obtained. The mixture was then cold-pressed to about 25% of its original volume, fired 20 minutes at 850° C., and then an additional 5 minutes at about 900° C. The product obtained had a density of 43 lbs./ft.$^3$.

EXAMPLE 5

Example 4 was repeated except that the sample was heated to 1850° F. over a six hour period, fired at 1850° F. for 2 hours, then cooled over a 24 hour period. The fired product having a density of 60.5 lbs./ft.$^3$ and a glazed surface.

Only by the use of the particular components disclosed herein is it possible to prepare a vermiculite board having flexural strength and lightness in weight and low firing temperatures. Generally, the final product is 30–90 parts vermiculite and preferably 40–60% vermiculite.

EXAMPLE 6

This example demonstrates one method of mixing larger quantities of material.

A total of 720 grams of bentonite, 600 grams of kaolin, 240 grams of wollastonite was premixed in a 16 quart V-blender, and 2400 grams of No. 5 vermiculite blended with it over a 5 minute period. An intensifier bar was used intermittently to improve mixing and yet not to densify the material. To this material was added a solution of 799 g. H$_2$O containing 25 grams of borax and 12.5 grams of sodium metaphosphate. This solution was added over a 3 minute period with the intensifier bar running to break up any balls which might form. The material was further V-blended for 2 minutes without the intensifier bar. A material suitable for molding was recovered as a product.

EXAMPLE 7

A quantity of the molding material prepared as described in Example 6 was pressed into a 6" x 6" x ¾" plate with 200 p.s.i. pressure. The sample was heated at 150° F. until dry and then fired at 1850° F. for 2 hours. The heat up time to temperature was 6 hours and the cooling time approximately 24 hours. The flexural strength of the final body was measured and found to be 960 p.s.i. The board was found to have a density of 58 pounds per cubic foot.

EXAMPLE 8

This example illustrates another firing cycle. A similar 6" x 6" x ¾" body was fired according to the same firing time cycle except with an upper temperature to 1950° F. the final body was found to have a flexural strength of 1685 p.s.i. and a density of 72 pounds per cubic foot.

EXAMPLE 9

This example demonstrates the properties obtained with a simpler blend of materials. The mixing procedure used in Example 6 is followed except that bentonite was substituted for kaolin and wollastonite. The body pressed from this material using the procedure of Example 7 has a density of 64 pounds per cubic foot and a flexural strength of 950 p.s.i.

EXAMPLE 10

This example illustrates the preparation of a metal mold from our molding material. A quantity of the material prepared in Example 6 is placed in an 8-inch diameter by 3-inch tall cylindrical mold shaped to make a depression in the molded vermiculite product which will receive the molten metal below. The depression is 1¾ inches deep and 6″ in diameter. A pressure of 200 p.s.i.g. is applied to the molding powder to form the molded vermiculite product. The product is taken from the press and dried in an oven at 150° F. for sixteen hours. The product may be used for casting metal immediately after drying or may be fired at 1600–1800° F. prior to use. The dried and unfired product has the advantage of greater porosity to facilitate rapid evolution of gases at the metal-vermiculite interface.

EXAMPLE 11

This example demonstrates another method of mixing larger quantities of material. The following parts by weight were mixed in a 20 ft.$^3$ V-blender.

| Material: | Parts by weight |
|---|---|
| #5 vermiculite | 112 |
| Georgia kaolin | 50 |
| Wyoming bentonite | 60 |
| F–1 Fiber grade wollastonite | 20 |
| Borax ($Na_2B_4O_7$—$10H_2O$) | 1.5 |
| Sodium metaphosphate ($NaPO_3$) | 0.75 |
| Water | 187 |

The mixture was prepared by first dry blending the vermiculite, kaolin, bentonite and wollastonite. To this was added the water solution of borax and phosphate through a dispersion bar.

EXAMPLE 12

The material prepared in Example 11 is placed in a mold and pressed at 160 p.s.i.g. to form a panel 12 x 12 x ½″. After drying the panel is fired in a furnace at 1880° F. for a period of 20 minutes. The density of the fired panel is 50 pounds per cubic foot. The flexural strength is 670 p.s.i. and the compressive strength is 1200 p.s.i.

EXAMPLE 13

Molten cast iron was placed into the mold prepared in Example 10. The vermiculite mold withstood the thermal shock and the metal cooled relatively slowly because of the insulative quality of the vermiculite. After removal of the metal, the mold could be used again to cast another piece of metal.

EXAMPLE 14

The material from Example 11 is used to prepare a synthetic aggregate as follows: the material from Example 11 has the consistency of a damp but free-flowing powder. It is poured into a hopper which permits a uniform delivery of the material to a Reneburg pug mill mixer. The blades of the pug mill are adjusted to obtain a residence time of about 2–5 minutes in the pug mill and thus obtain balled aggregates ranging from 0.1 inch to about 0.75 inch diameter with a major portion ranging from 0.25 to 0.6 inch in diameter. These aggregate particles are allowed to fall into a rotary oven where they are dried. The dried aggregate has a bulk density of about 15 lbs. per cubic foot. When fired at 1550° F., the aggregate has a density of 18 lbs. per cubic foot and a slight glazed appearance. The porosity can be reduced by firing at higher temperatures. Firing five minutes at 2220° F. produces a hard surface glaze and the density of the fired product is about 35 lbs. per cubic foot.

EXAMPLE 15

The material from Example 6 is added to the hopper of the granulating equipment described in Example 13. A small quantity of water may be added at the front part of the pug mill to facilitate the formation of the balled aggregate. A fluid clay slip is added to the aggregate at the center of the pug mill to enrich the surface of the aggregates with flux and binder. (The clay slip is prepared by mixing 1.5 g. borax, 0.75 g. sodium phosphate, 1 g. bentonite with 187 g. water). The balled aggregate is dried after it is removed from the pug mill mixer. The bulk density of the aggregate after drying and firing at 1800° F. is 25 lbs. per cubic foot.

EXAMPLE 16

This example demonstrates the preparation of a catalyst support. The aggregate of Example 14 which has been fired at 1550° F. is placed in a large volume of dilute hydrochloric acid and allowed to stand until substantially all the iron and aluminum is dissolved away leaving a strong siliceous ball. This material has a pore volume of 2.0 cm.$^3$/g. and a bulk density of 15 lbs. per cubic foot. This represents a relatively economic and simple method of producing ⅛″ to ¾″ silica balls which may be graded, if desired, for catalyst or other applications.

EXAMPLE 17

This example demonstrates the ability of the vermiculite molding powder to be formed into thin sections ⅛ ±1/16″ thick required for the preparation of cheap lightweight disposable dinnerware. The material from Example 6 is pressed at a pressure of about 150 p.s.i. to form a flat plate about ⅛″ thick. The plate is dried at 150° F. and fired for 10 minutes at 850° C. to form a strong, thin monolithic lightweight panel. The formation of a dish-shaped thin monolithic shape is expected to present no problems since the drying and firing shrinkage of our material is relatively small compared with ordinary clay products.

What is claimed is:

1. In a molding material consisting essentially of 12 to 88 weight percent exfoliated expanded vermiculite, 88–12 weight percent clay and 0–18 weight percent fibrous material, the improvement comprising the use of 0.01 to 4 weight percent sodium borate and 0.01 to 2 weight percent sodium phosphate as a flux.

2. The molding material according to 1 wherein said clay is selected from the group consisting of kaolin, bentonite, Georgia ball clay, shale and montmorillonite.

3. The molding material according to claim 1 wherein the fibrous material is selected from the group consisting of wollastonite, asbestos and glass wool.

4. A strong lightweight fusion bonded vermiculite board having a density of 12 to 80 pounds per cubic foot and a flexural strength of 30 to 2000 pounds per square inch having the composition:

12–88 weight percent exfoliated expanded vermiculite
88–12 weight percent clay
0.01–6 weight percent borax
0.01–3 weight percent sodium phosphate, and
0–18 weight percent fibrous material.

5. The board of claim 4 wherein the clay is selected from the group consisting of kaolin, bentonite, and Georgia ball clay.

6. The board of claim 4 which contains 0.1 to 18 percent of a fibrous material selected from the group consisting of wollastonite, asbestos and glass wool.

7. A process for preparing a molding material which comprises the steps of:
  (a) blending 12 to 88 weight percent exfoliated expanded vermiculite with 88 to 12 weight percent clay to form vermiculite-clay admixture.
  (b) preparing an aqueous solution containing 0.1 to 15 percent sodium borate and 0.005 to 7.5 percent sodium phosphate.
  (c) blending said vermiculite-clay admixture with said borate-phosphate solution to coat the vermiculite-clay particles.
  (d) recovering the molding material product.

8. A process for preparing a strong, lightweight fusion bonded vermiculite panel which comprises the following steps:
  (a) blending 88 to 12 weight percent exfoliated expanded vermiculite with 12 to 88 weight percent clay to form a vermiculite-clay admixture.
  (b) preparing an aqueous solution containing 0.1 to 15 percent sodium borate and 0.05 to 7.5 percent sodium phosphate.
  (c) blending said vermiculite with said borate-phosphate solution to coat the vermiculite-clay particles.
  (d) placing said coated vermiculite-clay blend in a mold and subjecting to a pressure of 10 to 3000 pounds per square inch to form a panel.
  (e) heating said panel to a temperature in the range of 950–1950° F.
  (f) cooling and recovering the product panel.

9. The process according to claim 8 wherein said clay is selected from the group comprising kaolin, bentonite, shale, illite, and montmorillonite.

10. The process according to claim 8 wherein the formed panel is maintained at a temperature of 950 to 1950° F. for a period of 0.1 to 3 hours.

11. The process according to claim 8 wherein said coated vermiculite-clay blend is heated to a temperature of 200 to 400° C. while being subjected to a pressure of 5 to 75 pounds per square inch.

References Cited
UNITED STATES PATENTS

| | | | |
|---|---|---|---|
| 1,830,253 | 11/1931 | Bechtner | 106—DIG. 4 |
| 1,927,102 | 9/1933 | Sucetti et al. | 106—DIG. 3 |
| 2,079,665 | 5/1937 | Seigle | 106—DIG. 3 |
| 2,090,480 | 8/1937 | Hawley | 106—DIG. 3 |
| 2,462,255 | 2/1949 | Charman et al. | 106—DIG. 3 |
| 2,956,893 | 10/1960 | Houston et al. | 106—71 |
| 3,030,218 | 4/1962 | Robinson | 106—71 |

JAMES E. POER, Primary Examiner

U.S. Cl. X.R.
106—71, DIG. 3